United States Patent [19]

Ursel et al.

[11] 4,157,666
[45] Jun. 12, 1979

[54] MOTION-TRANSMITTING ARRANGEMENT

[75] Inventors: Eckhard Ursel, Bühl; Horst Seibicke, Bühl-Altschweier; Helmut Rech, Baden-Baden; Rolf Horcher, Bühlertal; Hans-Joachim Linhart, Ottersweier; Erich Kolb, Bühl, all of Fed. Rep. of Germany

[73] Assignee: Robert Bosch GmbH, Stuttgart, Fed. Rep. of Germany

[21] Appl. No.: 811,910

[22] Filed: Jun. 30, 1977

[30] Foreign Application Priority Data

Jul. 3, 1976 [DE] Fed. Rep. of Germany ....... 2630067

[51] Int. Cl.² .......................... B60S 1/08; F16H 21/40
[52] U.S. Cl. ............................................. 74/75; 74/47
[58] Field of Search ..................... 74/75, 600, 40, 49, 74/50, 45, 46, 47, 48, 52; 15/250.17

[56] References Cited

U.S. PATENT DOCUMENTS

| 215,795 | 5/1879 | Cooper | 74/600 |
|---|---|---|---|
| 447,386 | 3/1891 | Vuillier | 74/600 UX |
| 2,232,480 | 2/1941 | Schmid | 74/75 UX |
| 2,753,721 | 7/1956 | Latta | 74/600 X |
| 2,949,035 | 8/1960 | Harrison | 74/47 X |
| 3,118,318 | 1/1964 | Rauhut | 74/600 UX |
| 3,588,940 | 6/1971 | Mainka et al. | 74/75 X |

Primary Examiner—J. Franklin Foss
Attorney, Agent, or Firm—Michael J. Striker

[57] ABSTRACT

A motion-transmitting arrangement, particularly for windshield wipers, has a drive with a rotary output shaft on which a crank member is mounted for rotation. A crank rod has one end connected to a crank pin which is transversely spaced from the shaft, and its other end is pivoted at one location to a member which latter is also pivoted at another location and which is coupled with an element (e.g., a wiper blade) to be moved. An arrangement is provided for varying the distance between the shaft and the crank pin and/or between the crank pin and the pivot at the one location and/or the pivot at the one location and the pivot at the other location.

7 Claims, 12 Drawing Figures

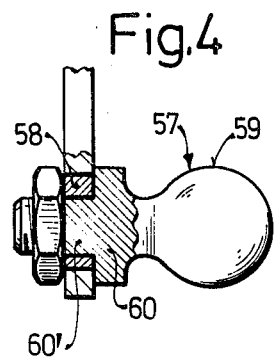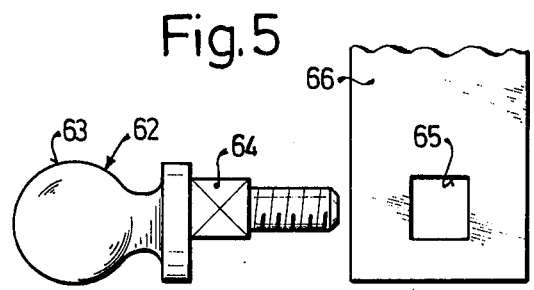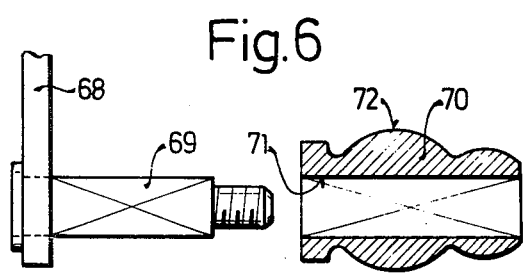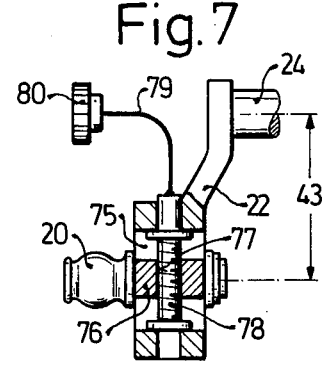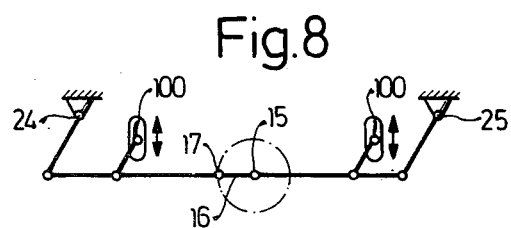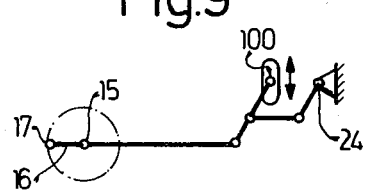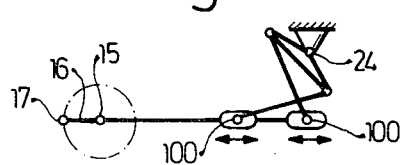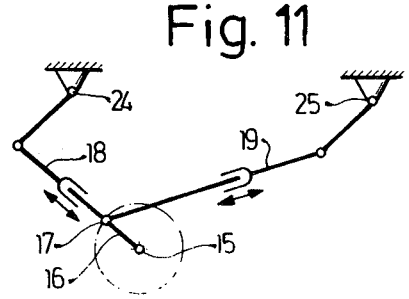

MOTION-TRANSMITTING ARRANGEMENT

BACKGROUND OF THE INVENTION

This invention relates to motion-transmitting arrangements.

The invention can be used to particular advantage in windshield wiping arrangements for vehicles (but is not limited thereto) and will, therefore, hereafter be described in the context of such a windshield wiping arrangement for a ready understanding.

Windshield wiping arrangements have been proposed wherein a rotary output shaft of a drive turns a crank which carries, laterally spaced from the output shaft, a crankpin. One end of a crank rod is pivotally connected to the crankpin and the other end is pivoted to one end of a link member whose other end is in turn pivoted on a fixed pivot point. A wiper blade is connected—usually indirectly—to the link member so as to move and wipe an area of a vehicle windshield, when the link member is pivoted to and fro by operation of the crank.

It has been found that in this otherwise satisfactory construction problems are encountered when the manufacturing tolerances for the component parts are not precisely maintained. This is, of course, not economically feasible in such mass-production articles with the result that, especially when the tolerance variations of all component parts add up together, the area wiped by the wiper blade may be either smaller or larger than intended. As every vehicle operator knows, this either means that unwiped (i.e., dirty) windshield portions remain between the edge of the windshield and the position at which the wiper blade movement is reversed, or that the wiper blade moves onto the frame of the windshield. The former reduces the vision area of the vehicle operator and constitutes a safety hazard; the latter results in premature damage and wear of the wiper blade and, since such wear often remains undetected (or at least uncorrected) for relatively long periods of time, ultimately also constitutes a safety hazard because a worn wiper blade will not give satisfactory wiping results.

Such problems do not necessarily occur immediately upon installation of the windshield wiping arrangement; quite frequently they come about only after the arrangement has been in use for a period of time, usually due to wear (and resulting play) in the pivots and journals of the movable components.

SUMMARY OF THE INVENTION

It is an object of the present invention to overcome the disadvantages of the prior art.

More particularly, it is an object of the invention to provide a motion-transmitting arrangement of the kind under discussion, wherein compensation is provided for malfunctioning or improper functioning resulting from tolerance variations and/or from wear and tear.

Another object of the invention is to provide such an arrangement which is simple in construction and operation, so that adjustments can be readily made and the arrangement is economically viable.

In keeping with these objects, and with others which will become apparent hereafter, one aspect of the invention resides in a motion-transmitting arrangement. Briefly stated, the arrangement may comprise a drive having a rotary output shaft; a crank member mounted on the output shaft for rotation therewith and having a crank pin spaced from the output shaft by a first distance; a motion-transmitting linkage driven by the crank member and including a member which is pivotable on two pivots spaced from one another by a second distance, and a crank rod connected to one of the pivots and to the crank pin which is spaced from the one pivot by a third distance; and means for varying at least one of the distances at the will of a user.

The novel features which are considered as characteristic for the invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 4 is a sectional view similar to FIG. 2 but of a different embodiment;

FIG. 5 is a fragmentary exploded view, showing a detail of a further embodiment of the invention;

FIG. 6 is a partly sectioned exploded view of a detail of yet an additional embodiment;

FIG. 7 is a partly sectioned detail view illustrating still another embodiment; and FIGS. 8-11 are respective diagrammatic illustrations, each show how the invention can be embodied in arrangements differing from the one illustrated in FIG. 1.

DESCRIPTION OF THE PREFERRED EMBODIMENTS

Figure 1:
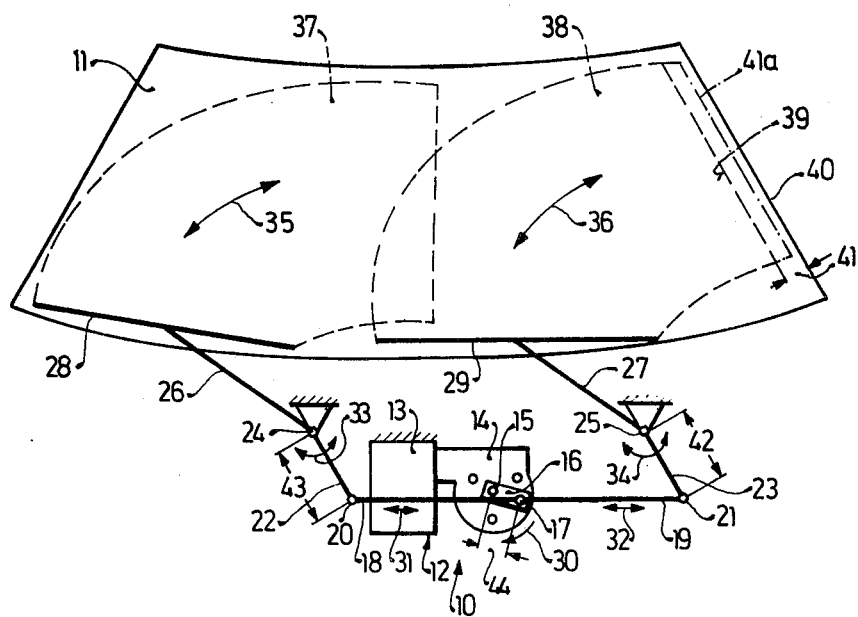
FIG. 1 is a diagrammatic illustration, showing the invention embodied in a windshield wiping arrangement for a vehicle.

The invention is illustrated in FIG. 1, by way of example, as being embodied in a windshield wiping arrangement of a vehicle. This can, of course, be any kind of vehicle, e.g., a motor vehicle, but it should be understood that the invention is not limited to use in this manner.

The arrangement 10 in FIG. 1 serves to wipe the windshield 11 of a motor vehicle (not shown). It is driven by a drive 12 which includes a prime mover, e.g., an electric motor 13 and a step-down gear unit 14. The latter has a rotary output shaft on which a crank 16 is mounted for rotation therewith; at or near its end remote from the shaft 15 the crank 16 is provided with a crank pin 17 to which two crank rods 18, 19 are pivotably connected.

The ends of the crank rods 18, 19 which are remote from the crank pin 17 are each pivoted to a pivot pin 20, 21, respectively. The pivot pins 20, 21 are in turn fixedly mounted on the ends of respective members (arms) 22 and 23. The other ends of arms 22, 23 are each connected to a pivotable (i.e., turnable) wiper shaft 24, 25, respectively. Each wiper shaft has connected to it (in a manner known per se and hence not requiring description) a respective wiper arm 26,27. In turn, each arm 26, 27 carries a respective wiper blade 28, 29 which is in contact with, and wipes over, the windshield 11. The drive 12 and the shafts 24, 25 are mounted stationarily relative to the vehicle, e.g., on the vehicle frame.

When the output shaft 15 rotates, the crank 16 turns in the direction indicated by the arrow 30, with the result that the crank rods 18 and 19 become displaced in the direction of the double-headed arrows 31 and 32, respectively. This causes the members 22,23 to oscillate as indicated by the double-headed arrows 33, 34, leading to a concomitant wiping movement of the blades 28, 29 in the direction indicated by the double-headed arrows 35, 36. During this wiping movement the blades wipe over the chainline areas 37, 38 of the windshield 11.

An examination of FIG. 1 will show that the area 38 is not large enough, since it leaves an unwiped region 41 of the windshield intermediate the reversing point 39 (where the blade 29 reverses its direction of movement) and the adjacent windshield edge 40. This is undesirable for safety reasons, but was heretofore not properly correctable.

In accordance with the invention such a correction is now possible, however, by shifting the reversing point of blade 29 from 39 to the location indicated by the broken line 41a. To accomplish this, the distance 42 between the axis of rotation of shaft 25 (about which the member 23 pivots) and the pivot pin 21 is decreased correspondingly, thereby increasing the pivot angle of member 23. This shifts the blade reversing point to the chain line 41a, increasing the wiped area 38 and eliminating the safety hazard previously posed by the unwiped (blind) area 41. It should be noted that this adjustment results in an equal and concomitant adjustment of the wiper blade 29. The area 37 wiped by the blade 29 is, however, of proper size and requires no correction. Therefore, a correction of the wiping area 38 requires that the wiper arm 27 be reset on its shaft 24 in order to maintain the area 37 at the proper size and in the proper position on windshield 11. Such resetting is accomplished via the usual tongue and notch connection (known per se) between wiper arm and wiper shaft.

Evidently, the adjustment must be reversed (i.e., the distance 42 be increased) if the wiped area 38 is too large and must be made smaller. Equally clear, the same types of corrections will be made with respect to distance 43 if the wiped area 37 is to be adjusted. If both of the areas 37, 38 require equal adjustments, this can be effected in a simple manner by varying the distance 44 between the axis of rotation of the shaft 15 (and hence of crank 16) and the crank pin 17. If the required corrections are of such magnitude that they cannot be effected by the adjustments described above, then the distance 44 as well as one or both of the distances 42, 43 can be varied.

The adjustment of the distances 44, 43 or 42 can be effected by changing the setting of the pins 17, 20 or 21, respectively.

Figure 2:
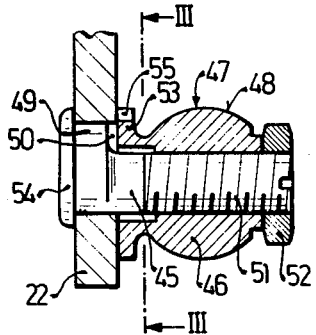
FIG. 2 is an axial section, on an enlarged scale, showing a detail of the embodiment in FIG. 1.

One embodiment permitting such a change in setting is shown in FIG. 2 on hand of the pin 20; the same embodiment can be used with pins 17 and 21. In FIG. 2 the pin is identified with reference numeral 47 and composed of a bolt 45 and a sleeve 46. The latter has an annular bearing surface 48 to be embraced by, e.g., a portion of the rods 18 or 19. Bolt 45 has a portion 49 which is eccentric with reference to the annular bearing surface 48 and which is turnably and arrestably received in a bore 50 of, e.g., the member 22 or 23. The shank 51 of bolt 45 is threaded and extends through a passage in sleeve 46; the free end of shank 51 projects axially beyond the sleeve 46 and has a nut 52 threaded onto it. When this nut is loosened, the portion 49 can be turned in bore 50, thereby shifting the central axis of shank 51 towards or away from (but always in parallelism with) the central axis of bore 50. Thus, the distance 42 or 43 can be varied within the limits imposed by the eccentricity of portion 49 relative to the central axis of shank 51. The pin 47 is then arrested again by tightening the nut 52, causing a flange 53 of sleeve 46 to abut one side of, e.g., member 22 while drawing a flange 54 of portion 49 into abutment with the opposite side of the member, as shown in FIG. 2.

Figure 2A:
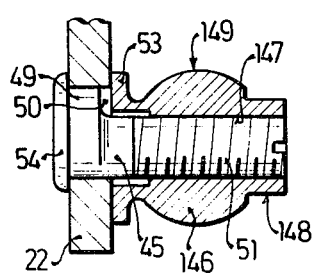
FIG. 2a is a view analogous to FIG. 2 but showing a somewhat different embodiment.

FIG. 2a shows a modification of the FIG. 2 embodiment, according to which the sleeve 149 is itself provided with an internal thread 147, so that the sleeve can be threaded onto the shank 51. This eliminates the separate nut 52. The exterior of the sleeve 149 is then advantageously provided with a polygonal (e.g., hexagonal) faceted portion 148 which can be engaged by a wrench or other tool to turn the sleeve 149. The construction in FIG. 2a makes it possible to reduce the length of pin 149 as compared to pin 47 (no attempt has been made to show this in FIGS. 2, 2a) which is an advantage in terms of access during the initial installation and later adjustment of the distances 42, 43.

Figure 3:
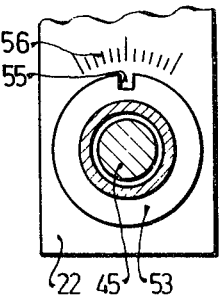
FIG. 3 is a section taken on line III—III of FIG. 2.

In either embodiment it is advantageous if, as shown in FIG. 3, the flange 53 of the sleeve is provided with a pointer or other indicator 55 which cooperates with a scale or other markings 56 on the associated member (e.g., member 22). Of course, this relationship could be reversed, but in any case it makes it simple to judge the degree by which the distance 42, 43 has been increased or decreased.

FIG. 4 shows that the desired eccentricity of the respective pin (here designated as pin 57) can also be obtained by providing the pin with a shank 60 that is concentric to the bearing surface 59 (for e.g., rods 18 or 19), and using an eccentric annular member 58 which surrounds a shank portion 60' that is received in the bore of, e.g., member 22.

Another possibility is shown in FIG. 5, where it will be seen that the respective member (here designated with numeral 66 but corresponding to members 22 or 23) may be provided with a polygonal (here quadratic) hole 65. The pin 62 is then provided with a matingly polygonal (here quadratic) portion 64 which is eccentric relative to the annular bearing surface 63. Of course, a nut (not shown) must be threaded onto the threaded part of the shank in FIG. 5 after the portion 64 is received in hole 65. The distance 42 or 43 is changed by inserting the portion 64 in different angular orientation in hole 65.

The embodiment of FIG. 6 is in essence a reversal of the concept shown in FIG. 5. The pin here has a bolt 69 of polygonal (e.g., quadratic) cross-section; this bolt 69 is rigidly connected (e.g., by welding) with the member 68. A sleeve 70 has a passage 71 which is of a polygonal cross-section mating to that of the bolt 69; the longitudinal axis of passage 71 is eccentric with reference to the annular bearing surface 72 on sleeve 70.

FIG. 7 shows an embodiment which is particularly (although not exclusively) intended to permit varying of the distances 42 or 43. In this embodiment the member 22 (or 23) is provided adjacent its free end with a cut-out 75. A sliding block portion 76 is provided on the pin 20 (or 21) and is located in the cut-out 75; it should be noted that the arrangement is such that the block portion 76 (and hence the pin 20) is movable radially in the cut-out relative to the axis of shaft 24 (or 25). The block portion 76 is provided with a tapped transverse bore 77 in which the threads of a screw spindle 78 engage; spindle 78 is turnably journalled in member 22 (or 23) and extends across the cut-out 75 in the direction in which pin 20 is to be displaced. To permit remote operation of this arrangement, one end of the spindle 78 has a flexible shaft 79 connected to it; the other end of this shaft 79 is connected to an arrestable wheel (e.g., handwheel, knob or the like). To vary the distance 43 (or 42) it is merely necessary to turn the wheel 80 in a sense either increasing or decreasing the distance, i.e., moving the pin 20 away from or towards the shaft 24. Naturally, the wheel 80 should be positioned at a location in or on the vehicle where it is readily accessible.

It will be noted that all embodiments have as a common concept that the distance 44 (between the axis of rotation of crank 16 and the crank pin 17) and/or the distance 42 (between pin 21 and shaft 25) and/or the distance 43 (between pin 20 and shaft 24) so as to vary the size of the area (37 or 38) wiped by the respective wiper blade.

The embodiments of variable-setting pins described in the foregoing can also be used to advantage in other contexts. For example, pins 100 (corresponding to any of the ones described earlier) can be used to adjust intermediate drives as shown in FIG. 8, step-up transmissions as shown in FIG. 9 and adjustable cross-bar linkages, as shown in FIG. 10.

In lieu of (or in addition to) the adjustments which are made possible by the pin-setting embodiments described in the preceding Figures, it is also possible to obtain adjustments of the wiping areas 37, 38 by making the rods 18, 19 and/or the members 22, 23 length-variable as diagrammatically shown in FIG. 11. Either or both of the rods 18, 19 and/or the members 22, 23 may, for example, be composed of two telescopable sections which can be arrested in a desired telescoped-together or telescoped-apart position, e.g., by the use of a set screw which is threaded through the outer telescopable section and bears against (or enters into one of a plurality of longitudinally spaced openings of) the inner section.

While the invention has been illustrated and described as embodied in an arrangement for wiping vehicle windshields, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a motion-transmitting arrangement, particularly in a windshield wiping arrangement, a combination comprising a rotary output shaft; a drive coupled with said output shaft for rotating the same in one direction; a crank member mounted on said output shaft for rotation therewith in said one direction and having a crank pin spaced from said output shaft by a first distance; a motion-transmitting linkage driven by said crank pin and including a member which is pivotable on two pivots spaced from one another by a second distance, one of said pivots having a pivot pin; a movable element operatively connected with said member to perform movements in response to pivoting of said member; and means for varying at least one of said distances to thereby adjust the movement performed by said movable element.

2. A combination as defined in claim 1, said linkage further comprising a crank rod connected to both of said pins.

3. A combination as defined in claim 2, at least one of said members having a hole, and the pin associated with said at least one member having an annular bearing surface embraced by a portion of said crank rod and an adjusting portion which is eccentric with reference to said bearing surface and is turnably and arrestably received in said hole.

4. A combination as defined in claim 3, wherein said associated pin has a shank projecting from said portion, and said annular bearing surface is provided on a bushing surrounding said shank.

5. A combination as defined in claim 3, wherein said at least one member is said crank member and said associated pin is said crank pin.

6. A combination as defined in claim 1, wherein said movable element is a wiper blade for a windshield of a vehicle.

7. In a motion-transmitting arrangement, a combination comprising a drive having a rotary output shaft; a crank member mounted on said output shaft for rotation therewith and having a crank pin spaced from said output shaft by a first distance; a motion-transmitting linkage driven by said crank member and including a member which is pivotable on two pivots spaced from one another by a second distance, and a crank rod connected to and extending one of said pivots to said crank pin over a third distance; and means for varying at least one of said distances at the will of a user.

* * * * *